United States Patent
Fujii (10) Patent No.: US 9,262,121 B2
(45) Date of Patent: Feb. 16, 2016

(54) STORAGE CONTROL DEVICE, ELECTRONIC APPARATUS, STORAGE MEDIUM, AND STORAGE CONTROL METHOD

(71) Applicant: KYOCERA DOCUMENT SOLUTIONS INC., Osaka (JP)

(72) Inventor: Koji Fujii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 120 days.

(21) Appl. No.: 14/170,278

(22) Filed: Jan. 31, 2014

(65) Prior Publication Data

US 2014/0215119 A1  Jul. 31, 2014

(30) Foreign Application Priority Data

Jan. 31, 2013  (JP) .................................. 2013-016395

(51) Int. Cl.
 *G06F 12/00* (2006.01)
 *G06F 5/06* (2006.01)
 *G06F 3/06* (2006.01)

(52) U.S. Cl.
 CPC .. *G06F 5/06* (2013.01); *G06F 3/06* (2013.01); *G06F 3/067* (2013.01)

(58) Field of Classification Search
 None
 See application file for complete search history.

(56) References Cited

U.S. PATENT DOCUMENTS 7,716,395 B2 *  5/2010  Sethi ............................... 710/52

FOREIGN PATENT DOCUMENTS

| JP | 11-096775 A | 4/1999 |
| JP | H11-232785 A | 8/1999 |
| JP | 2002-032127 A | 1/2002 |
| JP | 2012-252636 A | 12/2012 |

OTHER PUBLICATIONS

An Office Action; "Notice of Reasons for Rejection," issued by the Japanese Patent Office on Apr. 14, 2015, which corresponds to Japanese Patent Application No. 2013-016395 and is related to U.S. Appl. No. 14/170,278.

* cited by examiner

*Primary Examiner* — Brian Peugh
(74) *Attorney, Agent, or Firm* — Studebaker & Brackett PC (57) ABSTRACT

A storage control device includes a first storage unit, a write control unit, and a read control unit. The first storage unit includes a plurality of storage areas corresponding to a plurality of addresses. The write control unit performs a write process to sequentially designate one of the plurality of addresses and write data to the storage area corresponding to the designated address, in a predetermined first order. The read control unit performs a read process to sequentially designate one of the plurality of addresses and read data stored in the storage area corresponding to the designated address, in a second order opposite to the first order, starting with the address corresponding to the storage area in which data has been stored immediately near a predetermined start timing after the beginning of execution of the write process, the read process being started at the predetermined start timing.

8 Claims, 5 Drawing Sheets

STORAGE CONTROL DEVICE, ELECTRONIC APPARATUS, STORAGE MEDIUM, AND STORAGE CONTROL METHOD

INCORPORATION BY REFERENCE

The present application claims priority under 35 U.S.C. §119 to Japanese Patent Application No. 2013-016395, filed Jan. 31, 2013. The contents of this application are incorporated herein by reference in their entirety.

BACKGROUND

The present disclosure relates to storage control devices, electronic apparatuses, storage media, and storage control methods.

In recent electronic apparatuses, such as image forming apparatuses, information processing apparatuses, etc., logging is performed to record, to an area (log area) for storing log information in a random access memory (RAM), information about an operation or state of each functional part included in the apparatus, information indicating the detected value of a sensor included in the apparatus, etc. The term "log" refers to data indicating the history of an operation, state, etc. of a computer or each functional part, i.e., a set of pieces of information (data) related to an operation, state, etc. of a computer or each functional part, which are obtained over time. The term "logging" refers to recording of data to the log area. If such a log is saved, then when a problem or an abnormality occurs in an operation of the apparatus, the log can help a maintenance person to find out a cause for the problem or the abnormality. For example, the maintenance person can find out a cause or background for the problem by analyzing the log which has been recorded before the occurrence of the problem. The log may contain the detected value of a sensor or information about an abnormality in addition to the history.

The memory for saving the log may be configured so that data is written thereto in time series and data stored before the current write time is overwritten. The reason is as follows. Logging is, for example, performed in order to find out a cause for a problem, if any. Therefore, data contained in the log does not have to be permanently stored, and may be stored for a predetermined period of time. Therefore, after the predetermined period of time has passed, data contained in the log may be erased or old data may be overwritten with new data. This may allow the size of the log area to fall within a predetermined value. The memory for saving the log may be, for example, a ring buffer.

A ring buffer is a buffer having a conceptually ring-like structure, that has a storage area which is logically connected end-to-end. Specifically, in a ring buffer, assuming that the leading and trailing ends of the storage area are indicated by addresses A and B, respectively, when the write or read address for the storage area reaches the address B, the next address is the address A. If the storage area is written or read backward, then when the write or read address for the storage area reaches the address A, the next address is the trailing address B.

For example, when a user programmable read only memory (ROM) in which data is erased only in sectors is used as a ring buffer, there is a known technique of erasing data while using sectors efficiently.

SUMMARY

A storage control device according to an aspect of the present disclosure includes a first storage unit, a write control unit, and a read control unit. The first storage unit includes a plurality of storage areas corresponding to a plurality of addresses. The write control unit performs a write process to sequentially designate one of the plurality of addresses and write data to one of the plurality of storage areas corresponding to the designated address, in a predetermined first order in which the plurality of addresses are arranged. The read control unit performs a read process to sequentially designate one of the plurality of addresses and read data stored in one of the plurality of storage areas corresponding to the designated address, in a second order opposite to the first order, starting with one of the plurality of addresses corresponding to one of the plurality of storage areas in which data has been stored immediately near a predetermined start timing after the beginning of execution of the write process, the read process being started at the predetermined start timing.

An electronic apparatus according to another aspect of the present disclosure includes a storage control device, and an operation unit configured to perform an operation. The storage control device includes a first storage unit, a write control unit, and a read control unit. The first storage unit includes a plurality of storage areas corresponding to a plurality of addresses. The write control unit performs a write process to sequentially designate one of the plurality of addresses and write data to one of the plurality of storage areas corresponding to the designated address, in a predetermined first order in which the plurality of addresses are arranged. The read control unit performs a read process to sequentially designate one of the plurality of addresses and read data stored in one of the plurality of storage areas corresponding to the designated address, in a second order opposite to the first order, starting with one of the plurality of addresses corresponding to one of the plurality of storage areas in which data has been stored immediately near a predetermined start timing after the beginning of execution of the write process, the read process being started at the predetermined start timing. Data stored in the plurality of storage areas of the first storage unit is operation data related to the operation of the operation unit. In the write process, the write control unit sequentially stores the operation data to the first storage unit in time series, to store history information about the operation of the operation unit to the first storage unit.

A storage medium according to still another aspect of the present disclosure is a non-transitory computer readable storage medium having stored thereon a storage control program that, when executed by a computer including a first storage unit having a plurality of storage areas corresponding to a plurality of addresses, causes the computer to perform an information process. The information process includes performing a write process to sequentially designate one of the plurality of addresses and write data to one of the plurality of storage areas corresponding to the designated address, in a predetermined first order in which the plurality of addresses are arranged, and performing a read process to sequentially designate one of the plurality of addresses and read data stored in one of the plurality of storage areas corresponding to the designated address, in a second order opposite to the first order, starting with one of the plurality of addresses corresponding to one of the plurality of storage areas in which data has been stored immediately near a predetermined start timing after the beginning of execution of the write process, the read process being started at the predetermined start timing.

A storage control method according to still another aspect of the present disclosure is a method performed by a storage control device including a first storage unit having a plurality of storage areas corresponding to a plurality of addresses. The storage control method includes performing a write process to sequentially designate one of the plurality of addresses and write data to one of the plurality of storage areas corresponding to the designated address, in a predetermined first order in which the plurality of addresses are arranged, and performing a read process to sequentially designate one of the plurality of addresses and read data stored in one of the plurality of storage areas corresponding to the designated address, in a second order opposite to the first order, starting with one of the plurality of addresses corresponding to one of the plurality of storage areas in which data has been stored immediately near a predetermined start timing after the beginning of execution of the write process, the read process being started at the predetermined start timing.

DETAILED DESCRIPTION

An embodiment of the present disclosure will now be described with reference to the accompanying drawings. Note that the same reference characters designate the same or corresponding parts throughout the several views, and will not be redundantly described unless necessary to describe differences, i.e., differences among these parts will be mainly described.

Figure 1:
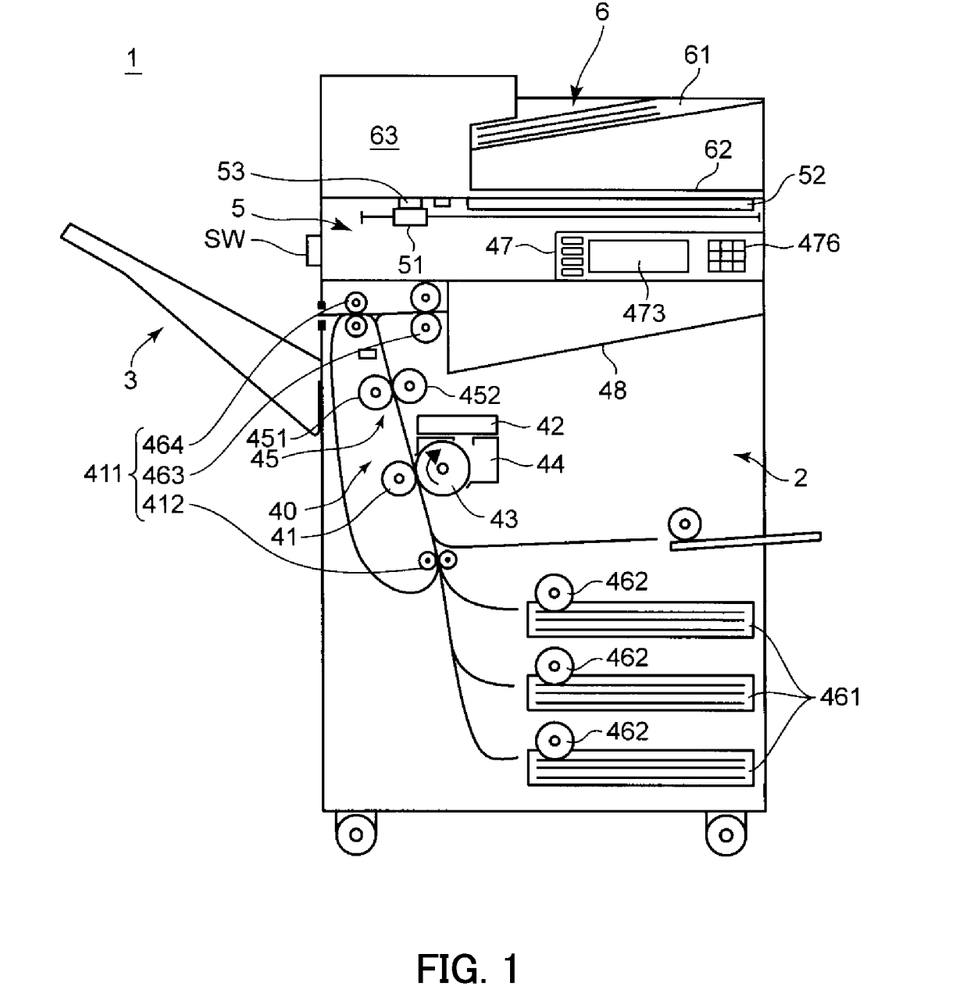
FIG. 1 is a diagram showing a structure of an example multifunction peripheral as an example electronic apparatus according to an embodiment of the present disclosure.

FIG. 1 is a diagram showing a structure of an example electronic apparatus according to an embodiment of the present disclosure. In this embodiment, the electronic apparatus is a multifunction peripheral 1. The multifunction peripheral 1 includes a storage control device 10 according to an embodiment of the present disclosure. The multifunction peripheral 1 is an image forming apparatus into which the functionality of a scanner, a copier, a printer, a facsimile machine, and the like is incorporated. Note that the electronic apparatus is not limited to the multifunction peripheral 1, and may be a copier, a printer, a facsimile machine, or the like. The electronic apparatus may also be a smartphone, a tablet PC, or the like.

The multifunction peripheral 1 includes a body 2, a stack tray 3, an original document capturing unit 5, and an original document feeder 6. The stack tray 3 is provided on the left of the body 2. The original document capturing unit 5 is, for example, provided in an upper portion of the body 2. The original document feeder 6 is, for example, provided above the original document capturing unit 5.

An operator panel unit 47 is provided on a front portion of the multifunction peripheral 1. The operator panel unit 47 has, for example, a generally rectangular shape corresponding to a shape of the front portion. The operator panel unit 47 includes a display unit 473 and an operation key unit 476. The display unit 473 is, for example, a liquid crystal display which also has the functionality of a touchscreen. The operation key unit 476 includes, for example, various key switches. The key switches are a start key which is used by the user to input a command for image formation, a numeric keypad which is used by the user to input the number of copies, etc.

The original document capturing unit 5 includes a scanner unit 51, an original document stage 52 formed from a transparent member such as glass or the like, and an original document capturing slit 53. The scanner unit 51 includes a charge coupled device (CCD) 512 and an exposure lamp 511 (see FIG. 2). The scanner unit 51 is movable by means of a drive unit (not shown). For example, when an original document placed on the original document stage 52 is captured, the scanner unit 51 is moved along a surface of the original document, facing the original document stage 52. The scanner unit 51 outputs, to a main CPU 110, image data which is obtained while scanning an image on the original document. For example, when an original document fed by the original document feeder 6 is captured, the scanner unit 51 is moved to a position where the scanner unit 51 faces the original document capturing slit 53. Thereafter, the scanner unit 51 obtains an image of the original document through the original document capturing slit 53 in synchronization with transportation of the original document performed by the original document feeder 6. Thereafter, the scanner unit 51 outputs the obtained image data to the main CPU 110. Note that, for example, a sensor 600 (see FIG. 2) for detecting a jam of an original document is attached to the original document capturing slit 53.

A main switch SW which turns on (supplies power) or off (stops power supply) a power supply to, for example, the entire apparatus is provided in a side portion of the original document capturing unit 5. The main switch SW is, for example, a rocker switch. Note that the main switch SW is not necessarily needed. Power may be supplied to the entire apparatus by connecting the multifunction peripheral 1 to the commercial power supply.

The original document feeder 6 includes an original document loading tray unit 61 for placing original documents, an original document output tray unit 62 for outputting original documents from which images have been captured, and an original document transport mechanism 63. The original document transport mechanism 63 picks up original documents placed on the original document loading tray unit 61, one sheet at a time, transports the original document to a position which faces the original document capturing slit 53, and outputs the original document to the original document output tray unit 62. Note that, for example, a sensor 601 (see FIG. 2) for detecting a jam or multi-feed (picking multiple sheets) of original documents is attached to the original document output tray unit 62, the original document transport mechanism 63, etc.

The body 2 includes a plurality of paper feed cassettes 461, feed rollers 462, and an image forming unit (an example operation unit) 40. The feed roller 462 picks up paper from the paper feed cassette 461, one sheet at a time, and transports the paper to the image forming unit 40. The image forming unit 40 forms an image on the paper transported from the paper feed cassette 461. Note that, for example, a sensor 602 (see FIG. 2) for detecting a paper jam or a multi-feed is attached around the paper feed cassette 461, the feed roller 462, etc.

The image forming unit 40 includes a paper transport unit 411, an optical scanning device 42, a photosensitive drum 43, a development unit 44, a transfer unit 41, and a fixing unit 45.

The paper transport unit 411 is provided in a paper transport path in the image forming unit 40. The paper transport unit 411 includes transfer rollers 412, 463, 464, etc. The transfer roller 412 feeds paper transported by the feed roller 462 to the photosensitive drum 43. The transfer rollers 463 and 464 transport paper to the stack tray 3 or an output tray 48. Note that, for example, a sensor 603 (see FIG. 2) for detecting a jam or multi-feed of paper is attached around the paper transport unit 411 etc.

The optical scanning device 42 emits laser light or the like based on image data output from the main CPU 110 to expose the photosensitive drum 43 with the light, thereby forming an electrostatic latent image on the photosensitive drum 43. The development unit 44 develops the electrostatic latent image on the photosensitive drum 43 with toner to form a toner image. The transfer unit 41 transfers the toner image from the photosensitive drum 43 to paper. Note that, for example, a sensor 604 (see FIG. 2) for detecting a voltage (exposure voltage) applied during exposure is attached to the optical scanning device 42. For example, a sensor 605 (see FIG. 2) for detecting an electrostatic voltage applied during development of an electrostatic latent image is attached to the development unit 44. For example, a sensor 606 (see FIG. 2) for detecting a voltage (pressure voltage) of the pressure unit or pressure applied during transfer of a toner image is attached to the transfer unit 41.

The fixing unit 45 heats paper with the transferred toner image to fix the toner image to the paper. The fixing unit 45 includes a heating roller 452 for melting a toner image formed on paper, and a pressure roller 451 for transporting paper while applying pressure to the paper between itself and the heating roller 452. For example, a sensor 607 (see FIG. 2) for detecting the temperature (fixing temperature) of the heating roller 452 for melting a toner image or the heater 453 (see FIG. 2), and a sensor 608 (see FIG. 2) for detecting the pressure value of the pressure roller 451, are attached to the fixing unit 45.

Figure 2:
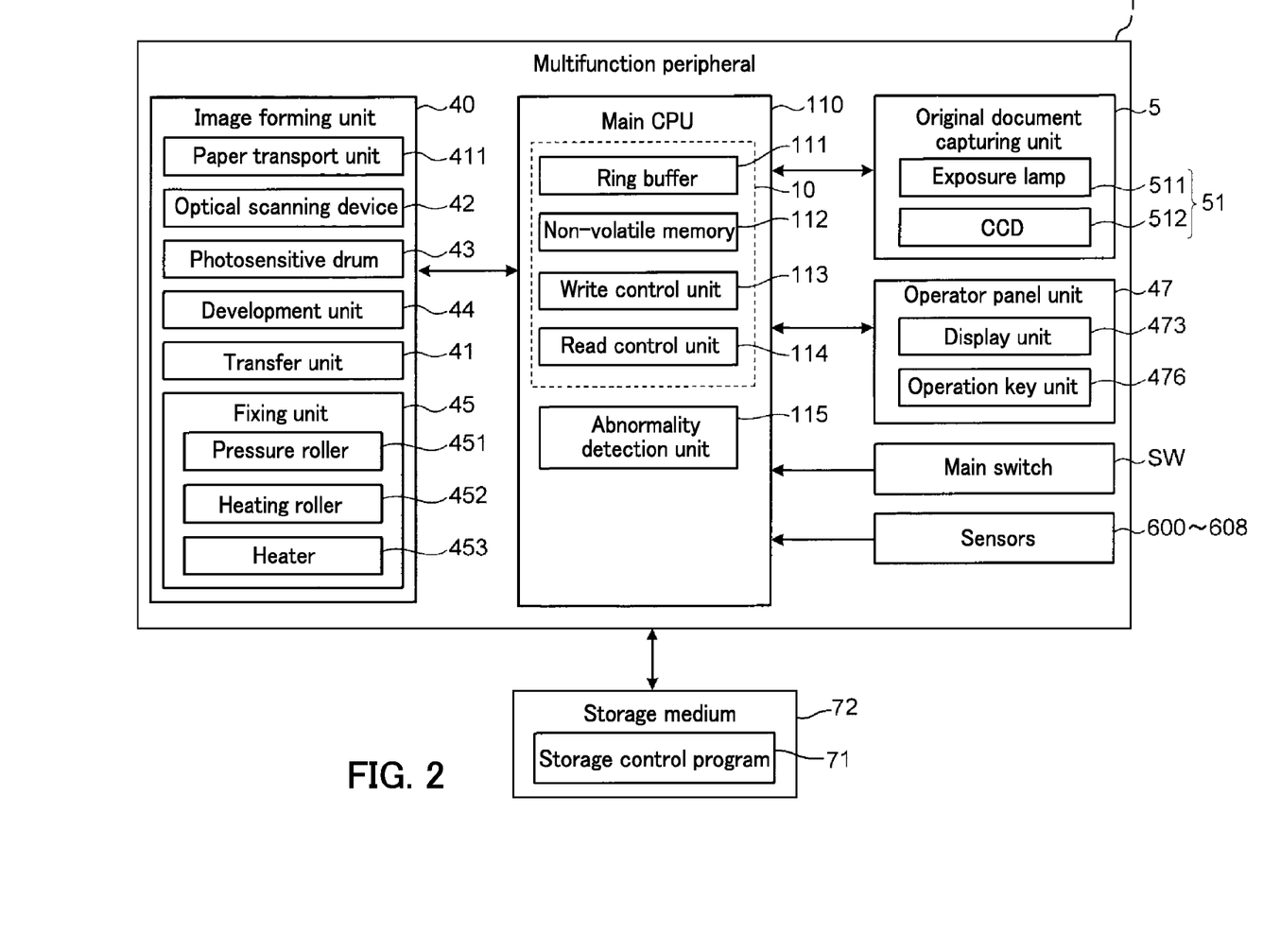
FIG. 2 is a block diagram showing an example internal configuration of the multifunction peripheral of FIG. 1.

FIG. 2 is a block diagram showing an example internal configuration of the multifunction peripheral 1 of FIG. 1. Additional elements shown in FIG. 2 will be mainly described with reference to FIG. 2.

The fixing unit 45 includes the pressure roller 451, the heating roller 452, and a heater 453. The heater 453 is, for example, provided inside the heating roller 452. The heater 453 heats paper nipped between the heating roller 452 and the pressure roller 451 by heating the heating roller 452.

The main CPU 110 controls the entire apparatus. During the beginning of power supply to the main CPU 110, the main CPU 110 outputs a system reset signal to reset systems of parts included in the apparatus. The main CPU 110 performs operations of a ring buffer 111, a non-volatile memory 112, a write control unit 113, a read control unit 114, and an abnormality detection unit 115. Note that the ring buffer 111, the non-volatile memory 112, the write control unit 113, and the read control unit 114 constitute the storage control device 10. In this embodiment, the write control unit 113 and the read control unit 114 are each implemented by the main CPU 110 executing a storage control program 71 which is software for a write process or a read process. The storage control program 71 may be previously installed in the multifunction peripheral 1, or alternatively, as shown in FIG. 2, installed into the multifunction peripheral 1 via a storage medium 72 storing the storage control program 71. The storage medium 72 is, for example, a CD-ROM, a digital versatile disc (DVD), a hard disk, or a non-volatile memory. The storage control program 71 may be read out via a drive device compatible with the storage medium 72 to be installed into the multifunction peripheral 1. Alternatively, the storage medium 72 storing the storage control program 71 may be included in a server connected to a communication network, and the multifunction peripheral 1 may access the server via the communication network to download the storage control program 71 from the storage medium 72 of the server. The write control unit 113 and the read control unit 114 may be implemented by hardware.

The ring buffer 111 is an example first storage unit. In the first storage unit, data in a storage area thereof may be overwritten with another new data. The ring buffer 111 is a memory which includes a plurality of storage areas corresponding to a plurality of addresses. The ring buffer 111 stores a log which is the history of an operation, state, etc. of the main CPU 110 or each functional part, i.e., a set of pieces of information (data) indicating an operation, state, etc. of the main CPU 110 or each functional part. Here, the functional parts are the original document capturing unit 5, the image forming unit 40, the fixing unit 45, the operator panel unit 47, etc. The storage area of the ring buffer 111 may be assigned to a storage area of a RAM.

The log saved in the ring buffer 111 helps a maintenance person to find out or analyze the operation, state, etc. of the CPU 110 or each functional part in an a posteriori manner. For example, when an abnormality occurs in the operation of the apparatus, the maintenance person may find out a cause for the abnormality by analyzing the log. In other words, for example, the maintenance person may find out a cause or background for the occurrence of a problem by analyzing the log which has been recorded before the occurrence of the problem. In the ring buffer 111, a storage area corresponding to an address at which a write operation is currently performed stores most recent data. The main CPU 110 can access storage areas which store older data, in the backward direction, using addresses preceding the address of the storage area storing the most recent data. For example, when an abnormality occurs, data which was written immediately near the time of occurrence of the abnormality seems to be most related to the abnormality and have a highest degree of importance. Also, a storage area having an address which is closer to the address of the storage area storing the data which was written immediately near the time of occurrence of the abnormality, seems to be more related to the abnormality and have a higher degree of importance.

Data stored as a log is information about an operation of each functional part (operation unit). The functional parts are the image forming unit 40, the transfer unit 41, the development unit 44, the fixing unit 45, the original document capturing unit 5, the original document feeder 6, the operator panel unit 47, the paper feed cassette 461, the feed roller 462, an intermediate transfer belt, etc. Examples of data stored as a log include information about operations or states of the functional parts, detected values of sensors, such as a temperature sensor etc., provided to the functional parts, abnormalities occurring in the sensors and the functional parts, etc. Although, in this embodiment, an intermediate transfer belt is not used, the multifunction peripheral 1 may include an intermediate transfer belt. Specifically, the multifunction peripheral 1 may transfer a toner image formed on the photosensitive drum to the intermediate transfer belt, and then transfer the toner image from the intermediate transfer belt to paper. In the description that follows, a case where an intermediate transfer belt is used is encompassed.

Examples of the operations of the functional parts include exposure by the optical scanning device 42, development of an electrostatic latent image by the development unit 44, application of pressure for transferring a toner image by the transfer unit 41, melting of a toner image by the fixing unit 45, etc.

Examples of the states of the functional parts include bit information stored in a status register of an LSI etc. used in each functional part, the temperature of a CCD included in the scanner unit 51, the temperature of a laser included in the optical scanning device 42, the potential of the photosensitive drum 43 in the development unit 44, a transfer voltage in the transfer unit 41, the temperatures of the heating roller 452 and the heater 453 in the fixing unit 45, the amount of remaining toner, the amount of remaining paper, the presence or absence of an original document left on the original document stage 52, etc.

Examples of the detected values of the sensors include the value of an exposure voltage in the optical scanning device 42, the value of an electrostatic voltage in the development unit 44, the value of a transfer voltage in the transfer unit 41, the value of a fixing temperature in the fixing unit 45, etc.

Examples of the abnormalities occurring in the functional parts include abnormalities due to a jam or multi-feed of original documents, abnormalities due to a jam or multi-feed of paper, an abnormal exposure voltage value in the optical scanning device 42, an abnormal electrostatic voltage value in the development unit 44, an abnormal transfer voltage value in the transfer unit 41, an abnormal fixing temperature value in the fixing unit 45, meandering of the intermediate transfer belt, a failure in a switch, lack of toner, etc.

Note that the abnormality detection (detection of the occurrence of an abnormality) is performed by the abnormality detection unit 115 as follows. The abnormality detection unit 115 detects an abnormality, for example, if the detected value of a temperature sensor is not within a predetermined range. The abnormality detection unit 115 detects an abnormality, for example, if a voltage value is not within a predetermined range. The abnormality detection unit 115 detects an abnormality, for example, if a temperature value is higher or lower than a predetermined value range. The abnormality detection unit 115 detects an abnormality which is meandering of the intermediate transfer belt, for example, if the detected value of a tension sensor for detecting the tension of the belt is not within a predetermined value range. The abnormality detection unit 115 detects an abnormality which is a failure in a switch, for example, if chattering is detected or there has been no input over a predetermined period of time. The abnormality detection unit 115 detects an abnormality which is lack of toner, for example, if a toner amount detection sensor detects lack of toner. The abnormality detection unit 115 detects an abnormality which is a jam or multi-feed of original documents or paper, for example, if a sensor detects the jam or multi-feed.

The non-volatile memory 112 is an example second storage unit. The non-volatile memory 112 is used to save a log read from the ring buffer 111. For example, the non-volatile memory 112 stores data which had been recorded in the ring buffer 111 before the occurrence of an abnormality and was read from the ring buffer 111 on the occurrence of the abnormality, i.e., data contained in a log. The non-volatile memory 112 is, for example, a non-volatile storage device, such as a flash ROM, an electrically erasable programmable ROM (EEPROM), etc. The reason why a log is saved in the non-volatile memory 112 is that even if the power supply is turned off or interrupted, the log remains in the non-volatile memory 112, and therefore, a maintenance person may find out a cause for an abnormality by reading and referencing the log. If an abnormality occurs, the power supply may be turned off or interrupted. Therefore, it is useful to save a log to the non-volatile memory 112.

Note that the ring buffer 111 can be simultaneously written and read. Therefore, the main CPU 110 can simultaneously write both the non-volatile memory 112 and the ring buffer 111. Specifically, the main CPU 110 can read data from the ring buffer 111 and then write the read data to the non-volatile memory 112 in parallel to a data write operation to the ring buffer 111. With this configuration, even in case of emergency such as an abnormality etc., while the read control unit 114 reads important data from the ring buffer 111 and then writes the data to the non-volatile memory 112, the write control unit 113 can write the operation log, state log, etc. of each functional part to the ring buffer 111 in parallel without interruption.

The write control unit 113 performs a write process. In the write process, the write control unit 113 sequentially designates addresses in a predetermined first order in which a plurality of addresses are arranged in the ring buffer 111, and sequentially stores data to storage areas corresponding to the designated addresses. The first order may be any order in addition to the order (ascending order, descending order, etc.) of address. In this embodiment, the first order is an order of successive addresses of the ring buffer 111 which are provided at predetermined positions in a RAM, starting with the leading address toward the trailing address. An address at which a write operation is performed first is, for example, the leading address of the ring buffer 111. In this embodiment, the write address is incremented.

Note that, in the write process to the ring buffer 111, after storing data to a storage area corresponding to the last address in the first order, the write control unit 113 next sequentially designates addresses from the first address in the first order to continue the write process. In other words, in the write process, when the last address in the first order (in this embodiment, the trailing address of the ring buffer 111) is reached, the first address in the first order (in this embodiment, the leading address of the ring buffer 111) is designated as the next address.

The read control unit 114 performs a read process. In the read process, the read control unit 114 sequentially designates addresses in a second order which is the opposite order to the first order, from a predetermined start timing after the execution of the write process, starting with an address corresponding to a storage area in which data has been stored immediately near the predetermined start timing, to sequentially read, from the ring buffer 111, data stored in storage areas corresponding to the designated addresses. The second order is the opposite order to the first order. Therefore, in this embodiment, the read process is performed in a direction of successive order from the trailing address to the leading address of the ring buffer. The read process may be started from any address. In this embodiment, the start address is an address at which the write control unit 113 has performed a write operation on or immediately before the occurrence of an abnormality in a functional part, in order to save a log when an abnormality occurs. This is because a storage area corresponding to an address which is closer to the address of the storage area at which the write control unit 113 has performed a write operation on or immediately before the occurrence of an abnormality, seems to store data which is more related to the abnormality and has a higher degree of importance. In other words, the predetermined start timing in this embodiment is when an abnormality occurs in a functional part, or specifically, when the abnormality detection unit 115 detects an abnormality in a functional part. Note that, in this embodiment, the read address is decremented.

The read control unit 114 also stores data read by the read process to the non-volatile memory 112.

In this embodiment, the main CPU 110 sequentially reads data in the opposite order to the order in which data was stored, immediately after a time when an abnormality occurs, and saves the data to the non-volatile memory 112. Therefore, even when the reading speed is lower than the writing speed, a log having a high degree of importance and a high degree of necessity, that has been recorded before the occurrence of a problem, can be saved to the non-volatile memory 112 before being overwritten.

Note that after reading data from the ring buffer 111 with the last address in the second order being designated, the read control unit 114 next sequentially designates addresses, starting with the first address in the second order, to perform the read process. In other words, in the read process, when the last address in the second order (in this embodiment, the leading address of the ring buffer 111) is reached, the first address in the second order (in this embodiment, the trailing address of the ring buffer 111) is designated as the next address.

The reason why the read process is performed in such a manner is as follows. In general, the data writing speed to the non-volatile memory 112 is lower than the data writing speed to and the data reading speed from the ring buffer 111 (RAM). Therefore, when data is read from the ring buffer 111 and then written to the non-volatile memory 112, the data reading speed from the ring buffer 111 is limited by the data writing speed to the non-volatile memory 112. Therefore, the data reading speed from the ring buffer 111 is lower than the data writing speed to the ring buffer 111. Therefore, when the non-volatile memory 112 and the ring buffer 111 are used in combination, a log which is needed may be unfortunately overwritten with new data before being read from the ring buffer 111. In a log, old data may be overwritten with new data after a predetermined period of time (for example, a period of time which is long enough to produce history which enables a maintenance person to find out, analyze, etc. an abnormality) has passed. However, a log is saved in order to help a maintenance person to, for example, find out a cause for the occurrence of a problem, if any, and therefore, if a log having a high degree of importance and a high degree of necessity, that has been recorded before the occurrence of a problem, is overwritten with new data and therefore eliminated before being read out, a maintenance person cannot successfully find out a cause for the occurrence of a problem based on the log.

Note that, in order to address such a drawback, the following technique may be used, for example. Specifically, another memory (hereinafter also referred to as a "copy buffer") may be provided between the ring buffer 111 and the non-volatile memory 112. A predetermined amount of log is periodically copied and the resultant copy is saved to the copy buffer. Thereafter, the data in the copy buffer is stored to the non-volatile memory 112. In this case, however, the use of the copy buffer leads to problems, such as an increase in the number of parts, a more complicated configuration, an increase in cost, etc.

In the storage control device 10 of this embodiment, the order in which data is read from the ring buffer 111 is the second order which is opposite to the first order for the write process, and the read process begins at an address at which the write control unit 113 has performed a write operation on or immediately before detection of an abnormality in a functional part. Therefore, a log which has been recorded before the occurrence of an abnormality can be saved to the non-volatile memory 112 as soon as possible. Therefore, in this embodiment, the copy buffer between the ring buffer 111 and the non-volatile memory 112 is not needed.

As shown in FIG. 2, the multifunction peripheral 1 of this embodiment includes the original document capturing unit 5, the image forming unit 40, the fixing unit 45, and the operator panel unit 47, which are operation units (functional parts) which perform respective predetermined operations. The write control unit 113 performs the write process to sequentially write information about operations, states, etc. of the functional parts in time series to the ring buffer 111 to produce a log.

The abnormality detection unit 115 detects an abnormality in each functional part. The abnormality detection unit 115 may detect an abnormality in each of the sensors 600-608 as an abnormality of a corresponding functional part. Abnormalities in the functional parts and a technique of detecting the abnormalities have been described above.

Figure 3:
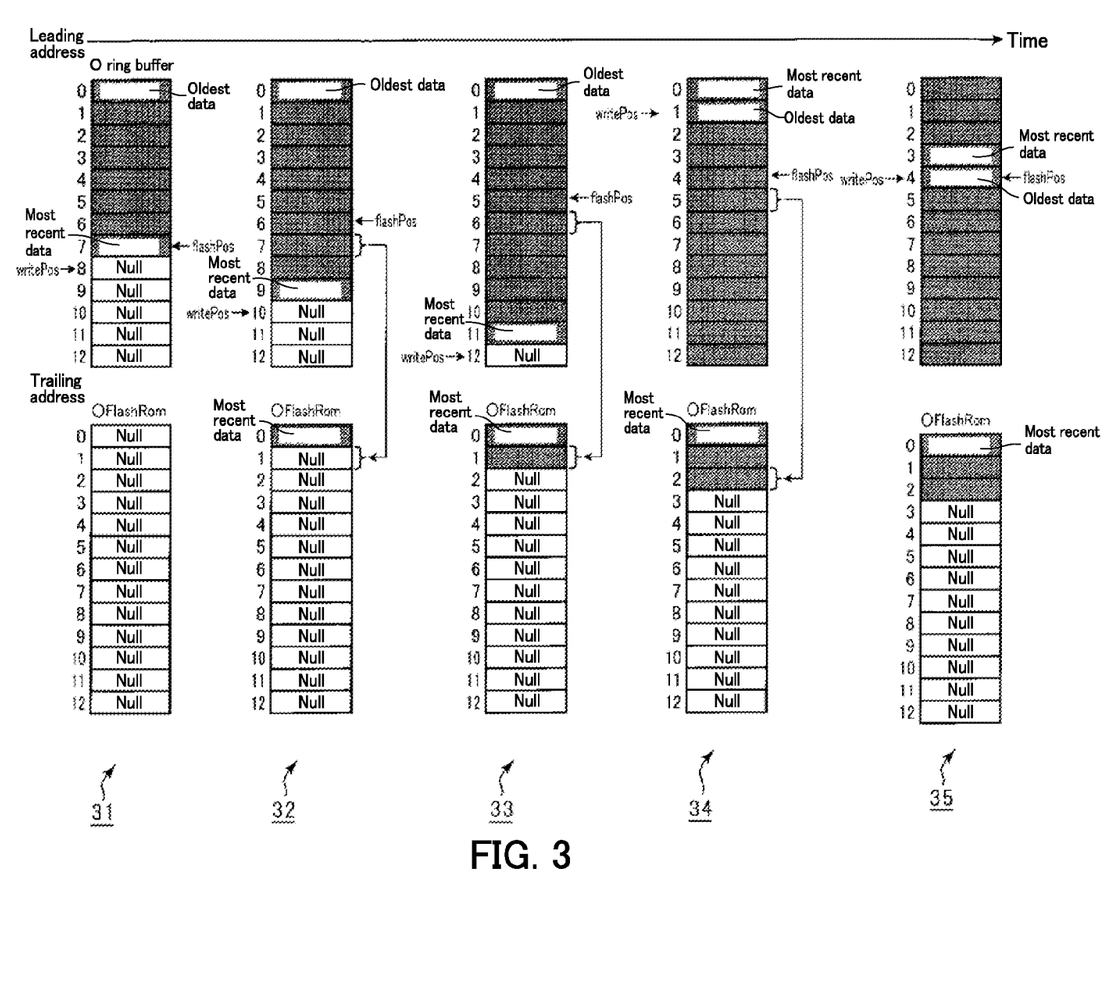
FIG. 3 is a diagram for describing a write process and a read process on a ring buffer and a write operation to a non-volatile memory according to an embodiment of the present disclosure.

An operation of, when an abnormality occurs in a functional part, reading data contained in a log from the ring buffer 111 and storing the data to the non-volatile memory 112 (in FIG. 3, a "flash ROM") will be described with reference to FIG. 3. In FIG. 3, the ring buffer 111 and the non-volatile memory 112 (flash ROM) are schematically arranged side by side in the vertical direction. The horizontal direction represents elapsed time. Specifically, FIG. 3 shows that the states of the ring buffer 111 and the non-volatile memory 112 change over time from a state 31 to a state 35. The ring buffer 111 and the non-volatile memory 112 each include a plurality of storage areas (save areas) corresponding to a plurality of addresses. Note that address numbers 0-12 are sequentially assigned to the storage areas of each of the ring buffer 111 and the non-volatile memory 112, starting with the uppermost storage area, for the sake of convenience. Although only 13 storage areas are shown for each of the ring buffer 111 and the non-volatile memory 112 because of space limitations, each of the ring buffer 111 and the non-volatile memory 112 may include any number of storage areas. The storage areas of the ring buffer 111 and the non-volatile memory 112 include hatched ones and non-hatched ones. The hatched areas indicate storage areas in which data has been written by the write control unit 113 or the read control unit 114. The non-hatched areas indicate storage areas in which data has not been written.

A write pointer (in FIG. 3, "writePos") indicates an address (the next address) immediately succeeding an address (write address) at which data has been written most recently. A read pointer (in FIG. 3, "flashPos") indicates an address (the previous address) immediately preceding, in address order, an address (read address) at which data has been read most recently (the previous address is the next address in the second order).

In the ring buffer 111, when most recent data is written to a storage area corresponding to an address indicated by the write pointer, the write control unit 113 increments the write pointer by one to move the write pointer to the next address. Thereafter, every time the write control unit 113 writes most recent data to the ring buffer 111, the write control unit 113 increments the write pointer by one. Thereafter, when the write pointer reaches the trailing address of the ring buffer 111, the write control unit 113 designates an address indicted by the write pointer and then writes most recent data to the ring buffer 111 at the designated address, and thereafter, sets the write pointer back to the leading address.

On the other hand, the ring buffer 111 is read as follows: the read control unit 114 performs the read process to read data from a storage area corresponding to an address indicated by the read pointer, and then writes the data to the non-volatile memory 112; and thereafter, the read control unit 114 moves the read pointer to the next address. Note that the read pointer is moved in the opposite direction to the direction in which the write pointer is moved, i.e., the read pointer is decremented by one. Thereafter, every time the read control unit 114 reads data from the ring buffer 111, the read control unit 114 decrements the read pointer by one. When the read pointer reaches the leading address of the ring buffer 111, the read control unit 114 reads data at an address indicated by the read pointer, and then moves the read pointer to the trailing address. Note that the read process is performed in parallel with the write process.

The state 31 of FIG. 3 indicates the states of the ring buffer 111 and the non-volatile memory 112 at a time when the abnormality detection unit 115 detects an abnormality. No data has been stored in the non-volatile memory 112, i.e., the non-volatile memory 112 is empty. The write pointer has been set by the write control unit 113 to the next address (address 8) succeeding an address (address 7) corresponding to a storage area which stores most recent data which was obtained immediately near the time of occurrence of the abnormality. On the other hand, the read pointer has been set by the read control unit 114 to the address (address 7) corresponding to the storage area which stores most recent data which was obtained immediately near the time of occurrence of the abnormality.

The write process to the ring buffer 111 by the write control unit 113, and the read process from the ring buffer 111 and the write process to the non-volatile memory 112 by the read control unit 114, will now be described with reference to FIG. 3 and a flowchart shown in FIG. 4.

When the write control unit 113 begins the write process to the ring buffer 111, the write control unit 113 causes the process to proceed to step S100. In step S100, as a normal logging operation, the write control unit 113 designates an address using the pointer "writePos" and then performs the write process to write most recent data to the ring buffer 111. Thereafter, the write control unit 113 causes the process to proceed to the next step S200.

In step S200, the write control unit 113 increments the pointer "writePos" by one, i.e., adds one to the pointer "writePos." Note that when this increment causes the position of the pointer "writePos" to move to the next address succeeding the trailing address (12) of the ring buffer 111, the write control unit 113 sets the pointer "writePos" back to the leading address (0). Next, the write control unit 113 causes the process to proceed to step S300.

In step S300, it is determined whether or not the abnormality detection unit 115 has detected an abnormality in a functional part. If the result of the determination in step S300 is positive ("YES"), the abnormality detection unit 115 causes the process to proceed to step S400. If the result of the determination in S300 is negative ("NO"), the abnormality detection unit 115 causes the process to proceed to step S100. Note that, after an abnormality has been detected, the abnormality detection unit 115 continues to cause the process to proceed from step S300 to step S400, without selecting the branch from step S300 back to step S100.

In steps S400-S700, because the abnormality detection unit 115 has detected the occurrence of an abnormality (YES in step S300), the read control unit 114 reads data which has been stored on the occurrence of the abnormality and data which has been stored before the occurrence of the abnormality, from the ring buffer 111, and then stores the data to the non-volatile memory 112.

Steps S400-S700 will now be described in detail. Note that data which has been stored on the occurrence of an abnormality means data which the write control unit 113 has written to the ring buffer 111 immediately near the occurrence of the abnormality. Therefore, in step S300, the read control unit 114 sets the pointer "flashPos" to the previous address preceding an address which is indicated by the pointer "writePos" which was set at the time when the abnormality detection unit 115 detected an abnormality (see the state 31 of FIG. 3). After the detection of the abnormality, the read control unit 114 begins the read process to designate the address using the pointer "flashPos" and then read data from the ring buffer 111.

In step S400, the read control unit 114 reads data from a storage area of the ring buffer 111 having the address indicated by the pointer "flashPos." Thereafter, the read control unit 114 causes the process to proceed to the next step S500.

In step S500, the read control unit 114 stores the data read from the ring buffer 111 to the non-volatile memory 112. The read control unit 114 causes the process to proceed to the next step S600.

In step S600, the read control unit 114 decrements the pointer "flashPos" by one, i.e., subscribes one from the pointer "flashPos." Note that, if this decrement causes the pointer "flashPos" to move to the previous address preceding the leading address of the ring buffer 111, the read control unit 114 sets the pointer "flashPos" back to the trailing address. The read control unit 114 causes the process to proceed to the next step S700.

As shown in FIG. 3, as time passes, the write control unit 113 sequentially writes data to the ring buffer 111 while incrementing the write pointer by one at a time (steps S100 and S200), to store a log in the ring buffer 111 (see the states 32 and 33 of FIG. 3). On the other hand, the read control unit 114 sequentially reads data from the ring buffer 111 while decrementing the read pointer by one at a time (step S400 and step S600) and then stores the read data to the non-volatile memory 112 (step S500). As a result, of the log, data which has been recorded immediately near the occurrence of an abnormality and data which has been recorded before the occurrence of the abnormality are stored in the non-volatile memory 112 (see the states 32 and 33 of FIG. 3). Note that when the state 33 of FIG. 3 is changed to the state 34, the write pointer reaches the trailing address (address 12) of the ring buffer 111. At this time, the write control unit 113 sets the write pointer back to the leading address in order to write new most recent data.

While the state 31 of FIG. 3 is changed to the state 34, six pieces of data are written to the ring buffer 111. On the other hand, the non-volatile memory 112 stores three pieces of data which have been recorded before the occurrence of an abnormality. In other words, during this period of time, while the pointer "writePos" is moved forward by six, the pointer "flashPos" is moved backward only by three. Thus, the writing speed is about twice as high as the reading speed.

Referring back to FIG. 4, in step S700, the main CPU 110 determines whether or not the value of "writePos−1" is equal to the value of "flashPos." If the pointer "writePos" and the pointer "flashPos" indicate the same storage area, then when the write control unit 113 writes most recent data to this storage area or the read control unit 114 reads data from this storage area, the relationship between the value of the pointer "writePos" and the value of the pointer "flashPos" becomes "flashPos=writePos−1." In this case, a log which should be stored to the non-volatile memory 112 is overwritten with most recent data and is thereby erased. Therefore, if "flashPos=writePos−1," the main CPU 110 determines to end saving of a log to the non-volatile memory 112 (YES in step S700). Thereafter, the main CPU 110 causes the process to proceed to step S800. Unless "flashPos=writePos−1" (NO in step S700), the main CPU 110 causes the process to proceed to step S100.

In the state 35 of FIG. 3, the pointer "writePos" and the pointer "flashPos" indicate the same address (address 4). If the pointer "writePos" and the pointer "flashPos" indicate the same address, then when the write control unit 113 writes most recent data to a storage area corresponding to that address or the read control unit 114 reads data from the storage area corresponding to that address, the relationship between the value of the pointer "writePos" and the value of the pointer "flashPos" becomes "flashPos=writePos−1." In this case, a log which should be stored to the non-volatile memory 112 is overwritten with most recent data and is thereby erased. Therefore, the read control unit 114 ends the read process from the ring buffer 111 and the write process to the non-volatile memory 112. In other words, the log write operation to the non-volatile memory 112 is ended.

Figure 4:
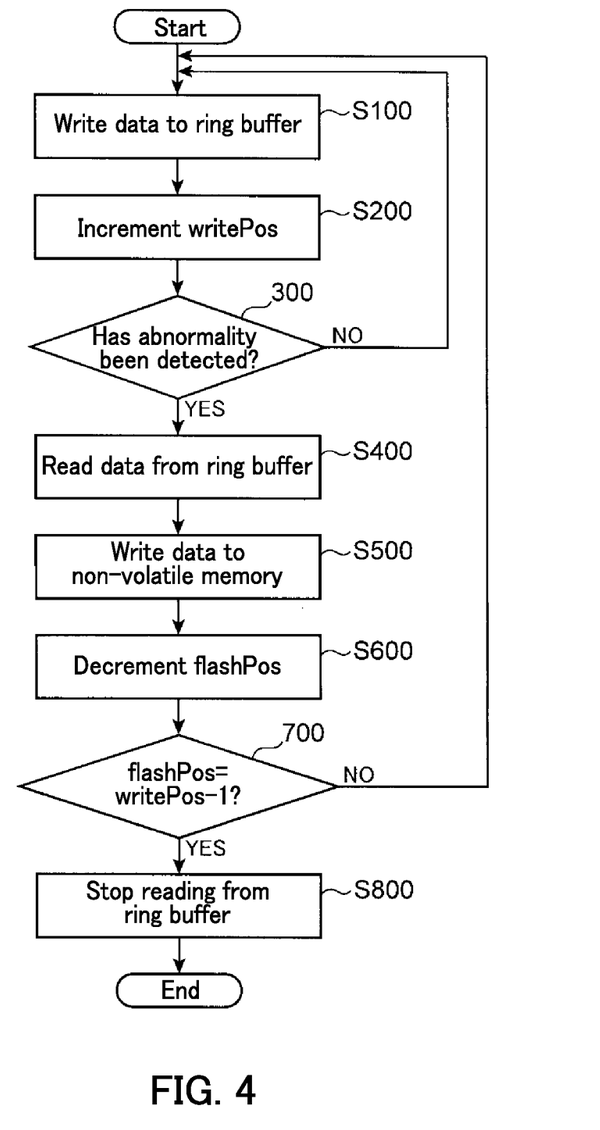
FIG. 4 is a flowchart of a process performed by the multifunction peripheral according to an embodiment of the present disclosure.

In step S800 of FIG. 4, the read control unit 114 ends the read process from the ring buffer 111 and the log save operation to the non-volatile memory 112.

Figure 5:
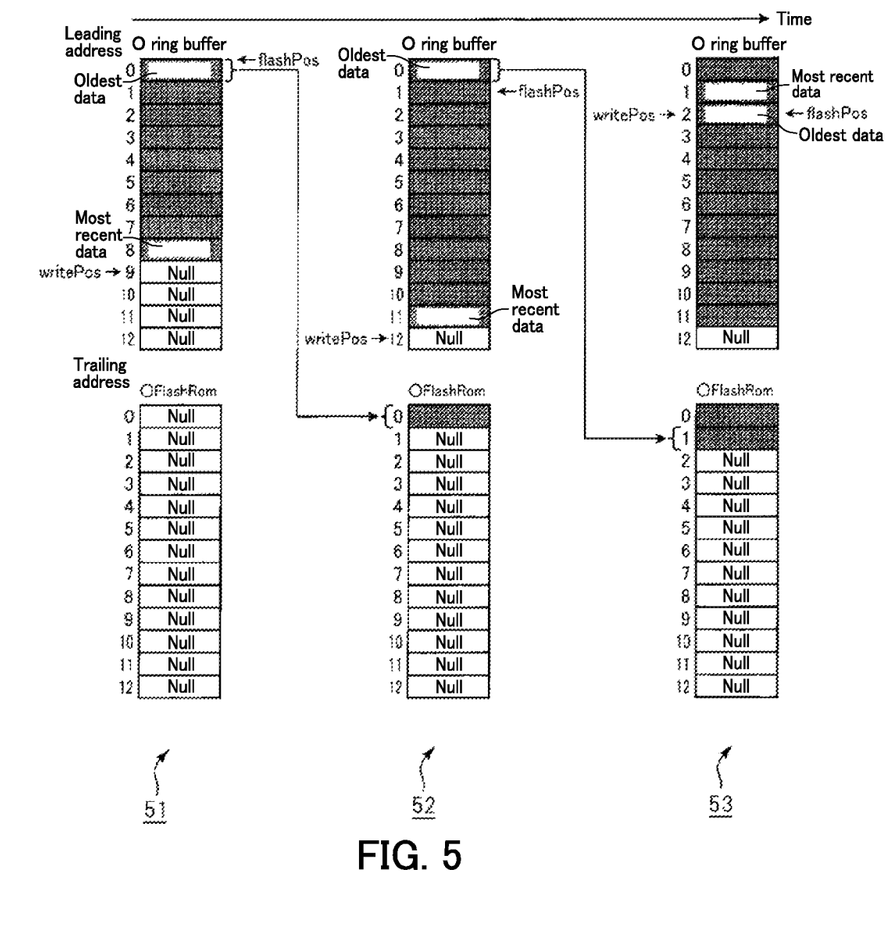
FIG. 5 is a diagram for describing a write process and a read process on a ring buffer and a write operation to a non-volatile memory according to the conventional art.

Next, a problem which occurs if the direction in which the read address is moved is the same as the direction in which the write address is moved, will be described with reference to FIG. 5. Although an operation shown in FIG. 5 is different from the operation of the storage control device 10 of this embodiment, a part corresponding to the write control unit 113 is referred to as a write control unit, and a part corresponding to the read control unit 114 is referred to as a read control unit, for the sake of convenience. FIG. 5 is a diagram for describing the write and read processes on the ring buffer 111 and the write operation to the non-volatile memory 112 when the direction in which the read address is moved is the same as the direction in which the write address is moved. In FIG. 5, the ring buffer 111 and the non-volatile memory 112 (flash ROM) are schematically arranged side by side in the vertical direction. The horizontal direction represents elapsed time. Specifically, FIG. 5 shows that the states of the ring buffer 111 and the non-volatile memory 112 change over time from a state 51 to a state 53. The ring buffer 111 and the non-volatile memory 112 each include a plurality of storage areas (save areas) corresponding to a plurality of addresses. Address numbers 0-12 are sequentially assigned to the storage areas of each of the ring buffer 111 and the non-volatile memory 112, starting with the uppermost storage area, for the sake of convenience.

The write control unit performs the write process to write most recent data to the ring buffer 111. Therefore, after writing the most recent data, the write control unit increments the write pointer (in FIG. 5, "writePos") by one to move the write pointer to the next address. On the other hand, the read control unit performs the read process from the ring buffer 111 in parallel. In this case, the read control unit performs the following operation according to a technique shown in FIG. 5.

The read control unit reads, from the ring buffer 111, data indicated by the read pointer (in FIG. 5, "flashPos"). The read control unit writes the read data to the non-volatile memory 112 and increments the read pointer by one. Note that the direction in which the read pointer is moved is the same as the direction in which the write pointer is moved, and the read pointer is incremented by one. Thereafter, every time the read control unit reads data from the ring buffer 111, the read control unit increments the read pointer by one. When the read pointer reaches the trailing address of the ring buffer 111, the read control unit reads data at an address indicated by the read pointer, and then moves the read pointer to the leading address. Thus, in the technique of FIG. 5, the read pointer is moved in a direction and manner similar to those of the write process.

In the state 51 of FIG. 5, the write pointer is set to the next address (address 9) succeeding an address (address 8) at which most recent data is stored. On the other hand, no data has been stored in the non-volatile memory 112, i.e., the non-volatile memory 112 is empty. The read pointer has been set to the address 0. Note that, in FIG. 5, in order to describe the problem, it is assumed that the read pointer begins with the address 0, instead of beginning reading at the time when an abnormality occurs.

In the example of FIG. 5, as time passes, the ring buffer 111 and the non-volatile memory 112 change from the state 51 to the state 53. In the state 52 of FIG. 5, the write pointer reaches the trailing address (address 12) of the ring buffer 111. When new most recent data is written to the address 12, the write control unit sets the write pointer back to the leading address. Note that, during the time between the state 51 and the state 52, the read control unit saves a piece of data to the non-volatile memory 112, and the write control unit writes three pieces of data to the ring buffer 111. Therefore, the writing speed is about triple as high as the reading speed.

In the state 53 of FIG. 5, the pointer "writePos" and the pointer "flashPos" indicate the same address (address 2). If the pointer "writePos" and the pointer "flashPos" indicate the same address, then when the write control unit writes most recent data to a storage area corresponding to that address, a log which should be saved to the non-volatile memory 112 is overwritten with most recent data and is thereby erased. Therefore, the read control unit ends the read process from the ring buffer 111 and the write process to the non-volatile memory 112. In other words, the log write operation to the non-volatile memory 112 is ended. Note that the read control unit may read data at that address before the write control unit writes most recent data. However, because the writing speed is higher than the reading speed, a case subsequently occurs where the write control unit writes most recent data to that address before the read control unit reads data from that address.

As described above, in the technique described with reference to FIG. 5, the writing speed is higher than the reading speed. The direction in which the write pointer is moved is the same as the direction in which the read pointer is moved. Therefore, when data is read from the ring buffer 111 and then written to the non-volatile memory 112, starting from the time of occurrence of an abnormality, the read control unit cannot write, to the non-volatile memory 112, a sufficient amount of data which has been recorded before the occurrence of the abnormality, compared to this embodiment. The reason is as follows. The direction in which the write pointer is moved is the same as the direction in which the read pointer is moved. Therefore, in order to read data which has been recorded before the occurrence of the abnormality, an address at which the read pointer begins (read start timing) is set to any timing before the occurrence of the abnormality and then the read pointer is incremented. However, because the writing speed is higher than the reading speed, the write pointer subsequently overtakes the read pointer. In this case, data which has been recorded immediately near the time of occurrence of the abnormality is overwritten by the write process and is thereby erased, and therefore, cannot be written to the non-volatile memory 112.

In the storage control device 10 and the multifunction peripheral 1 of this embodiment, the write control unit 113 performs the write process in the first order. The read control unit 114 performs the read process from the predetermined start timing after the beginning of execution of the write process, while sequentially designating addresses from an address corresponding to a storage area to which data has been stored immediately before the start timing, in the second direction opposite to the first order. As a result, for example, even when the reading speed is lower than the writing speed, the read process is performed sequentially backward from the data which has been stored immediately before by the write control unit 113. Therefore, the read control unit 114 can read the data which has been recorded immediately before and data preceding that data, i.e., data having a higher degree of importance, and save these pieces of data to the non-volatile memory 112 before these pieces of data are overwritten. In other words, when data which has been read from the ring buffer 111, which has a higher access speed, is written to the non-volatile memory 112, which has a lower access speed, the reading speed from the ring buffer 111 is limited by the writing speed to the non-volatile memory 112. Therefore, the reading speed from the ring buffer 111 is lower than the writing speed. Even in such a case, the storage control device 10 and the multifunction peripheral 1 according to this embodiment can save a log which is needed, before the log is overwritten.

Note that this embodiment is not limited to the case where the read control unit 114 reads data from the ring buffer 111 and then stores the read data to the non-volatile memory 112. For example, the multifunction peripheral 1 may include a communication circuit unit which can be connected to a communication line, such as a public network, a local area network (LAN), etc. The read control unit 114 may transmit data read from the ring buffer 111 to an external apparatus via the communication line. In this case, data read by the read control unit 114 is transmitted to a communication network etc. having a lower transfer speed, and therefore, the reading speed from the ring buffer 111 is limited by the lower transfer speed. Therefore, the reading speed from the ring buffer 111 is lower than the writing speed. Even in such a case, similar to the foregoing, a log which is needed can be saved before being overwritten.

The storage control device 10 and the multifunction peripheral 1 further include the non-volatile memory 112, which is the non-volatile second storage unit. The read control unit 114 stores data read by the read process to the non-volatile memory 112. Therefore, in addition to the foregoing advantage, even if the power supply to the multifunction peripheral 1 is interrupted, and therefore, data stored in the ring buffer 111, which is the first storage unit, is erased, the data remains in the non-volatile memory 112, and the read control unit 114 can read and reference the data.

The storage control device 10 and the multifunction peripheral 1 according to this embodiment can save a log which is needed, before the log is overwritten, by means of the above-described write and read processes, without providing an additional memory for buffering (copy buffer) between the ring buffer 111 and the non-volatile memory 112. Therefore, problems, such as an increase in the number of parts, a more complicated configuration, an increase in cost, etc., due to the use of an additional memory can be avoided.

With this configuration, the multifunction peripheral 1 includes the storage control device 10 having the above advantages. Therefore, the write process is performed in the first order, and after the beginning of execution of the write process, the read process is performed in the second order opposite to the first order, starting with an address at which data has been written by the write control unit 113 immediately before. Data stored in a storage area corresponding to an address at which the read process has begun and data stored in a storage area corresponding to the previous address preceding that address have a high degree of importance. Therefore, if the read process is performed from the address at which data has been written by the write control unit 113 immediately before, sequentially in the opposite order to the order in which data has been written, the read control unit 114 can read data having a high degree of importance before the data is overwritten and erased in the ring buffer 111. Therefore, in the multifunction peripheral 1, even if the reading speed is lower than the writing speed, data having a high degree of importance stored in the ring buffer 111 can be read from the ring buffer 111 and then stored to the non-volatile memory 112 before the data is overwritten.

The multifunction peripheral 1 also includes the abnormality detection unit 115 for detecting an abnormality in the operation units. The start timing is, for example, when the abnormality detection unit 115 detects an abnormality in an operation unit. As a result, in addition to the above advantages, the multifunction peripheral 1 can read, from the ring buffer 111, data which has been recorded before the occurrence of an abnormality in an operation unit. In order to remove an abnormality, data which has been recorded on and before the occurrence of the abnormality is important. By analyzing the data, a maintenance person may find out operations and states of the apparatus which occurred on and until the occurrence of the abnormality. Thus, if the start timing is set to a time when the abnormality detection unit 115 detects an abnormality in an operation unit, the read control unit 114 can read important data which has been recorded on and before the occurrence of an abnormality, and store the data to the non-volatile memory 112.

The electronic apparatus is, for example, an image forming apparatus (the multifunction peripheral 1) including an image forming unit for forming an image on paper. The multifunction peripheral 1 has the above advantages, and therefore, performs the write process in the first order, and after the beginning of execution of the write process, performs the read process in the second order opposite to the first order, starting with an address at which data has been written by the write control unit 113 immediately before. Data stored in a storage area corresponding to an address at which the read process has begun and data stored in a storage area corresponding to the previous address preceding that address have a high degree of importance. Therefore, if the read process is performed from the address at which data has been written by the write control unit 113 immediately before, sequentially in the opposite order to the order in which data has been written, the read control unit 114 can read data having a high degree of importance before the data is overwritten and erased in the ring buffer 111. Therefore, even when the reading speed is lower than the writing speed, the read control unit 114 can read data having a high degree of importance stored in the ring buffer 111 and then store the data to the non-volatile memory 112 before the data is overwritten. Note that if the start timing is when the abnormality detection unit 115 detects an abnormality, data stored in the ring buffer 111 is highly related to the abnormality, i.e., has a high degree of importance. As a result, information which will help to maintain the multifunction peripheral 1 remains without being erased, which makes it easier to maintain the multifunction peripheral 1.

The multifunction peripheral 1 also includes the ring buffer 111 having a plurality of storage areas corresponding to a plurality of addresses, and executes the storage control program 71. The storage control program 71 is executed to perform the following information process. Specifically, the write process is performed in the first order, and after the beginning of execution of the write process, the read process is performed in the second order opposite to the first order, starting with an address at which data has been written by the write control unit 113 immediately before. Data stored in a storage area corresponding to an address at which the read process has begun and data stored in a storage area corresponding to the previous address preceding that address have a high degree of importance. Therefore, if the read process is performed from the address at which data has been written by the write control unit 113 immediately before, sequentially in the opposite order to the order in which data has been written, the read control unit 114 can read data having a high degree of importance before the data is overwritten and erased in the ring buffer 111. Thus, the storage control program 71 can be provided in which even when the reading speed is lower than the writing speed, the read control unit 114 can read data having a high degree of importance stored in the ring buffer 111 and then store the data to the non-volatile memory 112 before the data is overwritten. The storage medium 72 in which the storage control program 71 is stored can also be provided.

A storage control method is also provided which is performed by the storage control device 10 including the ring buffer 111 having a plurality of storage areas corresponding to a plurality of addresses. In the method, the write process is performed in the first order, and after the beginning of execution of the write process, the read process is performed in the second order opposite to the first order, starting with an address at which data has been written by the write control unit 113 immediately before. Data stored in a storage area corresponding to an address at which the read process has begun and data stored in a storage area corresponding to the previous address preceding that address have a high degree of importance. Therefore, if the read process is performed from the address at which data has been written by the write control unit 113 immediately before, sequentially in the opposite order to the order in which data has been written, the read control unit 114 can read data having a high degree of importance before the data is overwritten and erased in the ring buffer 111. Thus, the storage control method can be provided in which even when the reading speed is lower than the writing speed, the read control unit 114 can read data having a high degree of importance, that is stored in the ring buffer 111, and then store the data to the non-volatile memory 112 before the data is overwritten.

While embodiments of the present disclosure have been clearly and fully described with reference to the drawings, various modifications and improvements can be made by those skilled in the art without departing from the spirit and scope of the present disclosure. Therefore, such modifications and improvements are intended to be embraced in the present disclosure.

The invention claimed is:

1. A storage control device comprising:
a first storage unit including a plurality of storage areas corresponding to a plurality of addresses;
a write control unit configured to perform a write process to sequentially designate one of the plurality of addresses and write data to one of the plurality of storage areas corresponding to the designated address, in a predetermined first order in which the plurality of addresses are arranged; and
a read control unit configured to perform a read process to sequentially designate one of the plurality of addresses and read data stored in one of the plurality of storage areas corresponding to the designated address, in a second order opposite to the first order, starting with one of the plurality of addresses corresponding to one of the plurality of storage areas in which data has been stored immediately near a predetermined start timing after the beginning of execution of the write process, the read process being started at the predetermined start timing, wherein, the write control unit designates the leading one of the plurality of addresses in the predetermined first order as an address to be next designated when, in the write process, data is stored to one of the plurality of storage areas corresponding to the trailing one of the plurality of addresses in the predetermined first order, and the read control unit designates the leading one of the plurality of addresses in the second order as an address to be next designated when, in the read process, data is read from one of the plurality of storage areas corresponding to the trailing one of the plurality of addresses in the second order.

2. A storage control device of claim 1, wherein
data in the plurality of storage areas of the first storage unit is allowed to be overwritten.

3. A storage control device of claim 1, further comprising:
a non-volatile second storage unit,
wherein
the read control unit stores data read in the read process to the second storage unit.

4. An electronic apparatus comprising:
the storage control device of claim 1; and
an operation unit configured to perform an operation,
wherein
data stored in the plurality of storage areas of the first storage unit is operation data related to the operation of the operation unit, and
in the write process, the write control unit sequentially stores the operation data to the first storage unit in time series, to store history information about the operation of the operation unit to the first storage unit.

5. An electronic apparatus of claim 4, further comprising:
an abnormality detection unit configured to detect an abnormality in the operation unit, wherein
the predetermined start timing is when the abnormality detection unit detects the abnormality.

6. An electronic apparatus of claim 4, wherein
the operation of the operation unit is formation of an image on paper.

7. A non-transitory computer readable storage medium having stored thereon a storage control program that, when executed by a computer including a first storage unit having a plurality of storage areas corresponding to a plurality of addresses, causes the computer to perform an information process,
wherein
the information process comprises:
performing a write process to sequentially designate one of the plurality of addresses and write data to one of the plurality of storage areas corresponding to the designated address, in a predetermined first order in which the plurality of addresses are arranged; and
performing a read process to sequentially designate one of the plurality of addresses and read data stored in one of the plurality of storage areas corresponding to the designated address, in a second order opposite to the predetermined first order, starting with one of the plurality of addresses corresponding to one of the plurality of storage areas in which data has been stored immediately near a predetermined start timing after the beginning of execution of the write process, the read process being started at the predetermined start timing, wherein
in performing a write process, the leading one of the plurality of addresses in the predetermined first order is designated as an address to be next designated when data is stored to one of the plurality of storage areas corresponding to the trailing one of the plurality of addresses in the predetermined first order; and in performing a read process, the leading one of the plurality of addresses in the second order is designated as an address to be next designated when data is read from one of the plurality of storage areas corresponding to the trailing one of the plurality of addresses in the second order.

8. A storage control method performed by a storage control device including a first storage unit having a plurality of storage areas corresponding to a plurality of addresses, comprising:

performing a write process to sequentially designate one of the plurality of addresses and write data to one of the plurality of storage areas corresponding to the designated address, in a predetermined first order in which the plurality of addresses are arranged; and performing a read process to sequentially designate one of the plurality of addresses and read data stored in one of the plurality of storage areas corresponding to the designated address, in a second order opposite to the predetermined first order, starting with one of the plurality of addresses corresponding to one of the plurality of storage areas in which data has been stored immediately near a predetermined start timing after the beginning of execution of the write process, the read process being started at the predetermined start timing, wherein in performing a write process, the leading one of the plurality of addresses in the predetermined first order is designated as an address to be next designated when data is stored to one of the plurality of storage areas corresponding to the trailing one of the plurality of addresses in the predetermined first order, and in performing a read process, the leading one of the plurality of addresses in the second order is designated as an address to be next designated when data is read from one of the plurality of storage areas corresponding to the trailing one of the plurality of addresses in the second order.

* * * * *